May 16, 1961 S. F. SINGER 2,984,783
MAGNETIC ORIENTER AND MAGNETIC GUIDANCE DEVICE FOR MISSILES
Filed Oct. 27, 1950 2 Sheets-Sheet 1

INVENTOR.
SIEGFRIED F. SINGER
BY
ATTORNEY

May 16, 1961 S. F. SINGER 2,984,783
MAGNETIC ORIENTER AND MAGNETIC GUIDANCE DEVICE FOR MISSILES
Filed Oct. 27, 1950 2 Sheets-Sheet 2
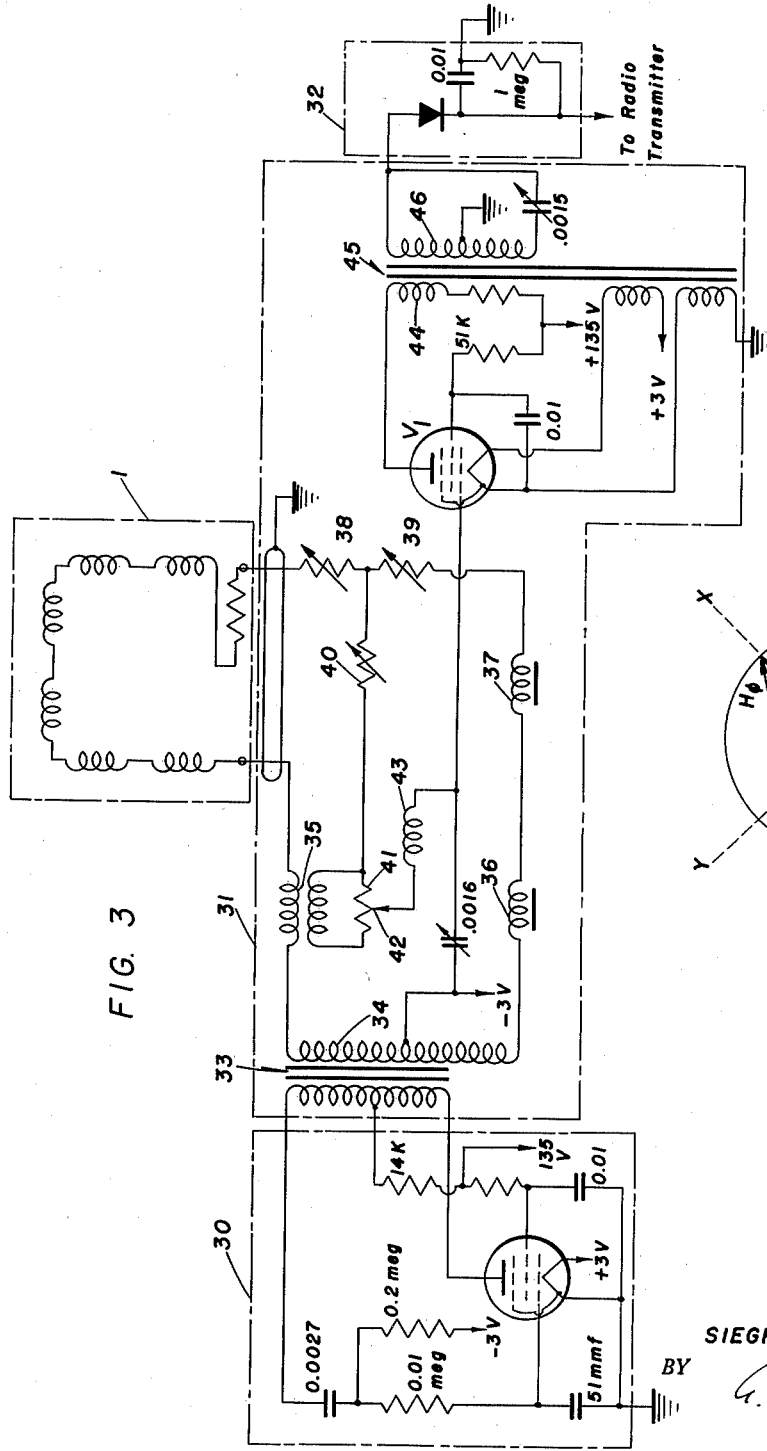
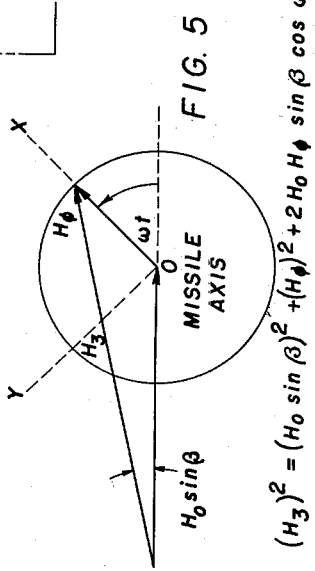
FIG. 5
$$(H_3)^2 = (H_0 \sin \beta)^2 + (H_\phi)^2 + 2H_0 H_\phi \sin \beta \cos \omega t$$
INVENTOR.
SIEGFRIED F. SINGER
BY
ATTORNEY

United States Patent Office 2,984,783
Patented May 16, 1961

2,984,783
MAGNETIC ORIENTER AND MAGNETIC GUIDANCE DEVICE FOR MISSILES

Siegfried F. Singer, Silver Spring, Md., assignor to the United States of America as represented by the Secretary of the Navy Filed Oct. 27, 1950, Ser. No. 192,592

8 Claims. (Cl. 324—43)

The present invention relates to means for determining the spatial orientation of an airborne or other vehicle, such as a missile, by means of the earth's magnetic field. More particularly, it relates to using a magnetometer as a magnetic orienter to aid in determining missile aspect.

Use of the earth's magnetic field as an orientation and guiding intelligence for missiles is essentially a self-contained (passive) method. It is not dependent on guidance intelligence received from the ground and therefore not susceptible to enemy countermeasures. The method is applicable at any time of day or night. Other systems of reference making use of the sun as defining a reference vector or using gyroscopes are not always applicable or easily workable.

An object of the invention is to determine the orientation of a vehicle, such as a missile, by means of a magnetometer, and auxiliary apparatus, carried by said vehicle.

A secondary object is to determine the altitude of the vehicle by magnetic measurements.

Other objects and many of the attendant advantages of this invention will be readily appreciated as the same becomes understood by reference to the following detailed description, when considered in connection with the accompanying drawings, wherein:

Fig. 3 is a circuit diagram, showing the details of the electrical components of Fig. 2;

Fig. 5 is a diagram showing the vector relationships of certain magnetic fields concerned in the invention.

The invention is here presented as applied to the problem of determining the aspect of a missile with respect to the earth's field by means of a total-field magnetometer, while the missile is in flight.

The total-field magnetometer is an instrument comprising, in its simplest form, three windings on Permalloy cores along three mutually perpendicular coordinate axes, and providing variable inductances proportional to the corresponding magnetic field intensities, $H_x$, $H_y$ and $H_z$. In accordance with the principles of solid analytic geometry, these three inductances, when squared and added to each other, yield a resultant proportional to $H^2$, the square of the total field strength. Expressed as an equation, this takes the form $H^2 = H_x^2 + H_y^2 + H_z^2$. The X, Y and Z axes may be taken in any orientation so long as they remain mutually perpendicular, without affecting the value of H as thus obtained. In other words, the magnetometer will determine the true value of H regardless of the direction of H with respect to the instrument.

If, however, an artificial field, produced within the missile, and fixed with respect to the missile axes, is applied, the magnetometer will measure the absolute, scalar, value of the resultant field, which is the vector sum of the earth's field and the internal field.

Figure 1:
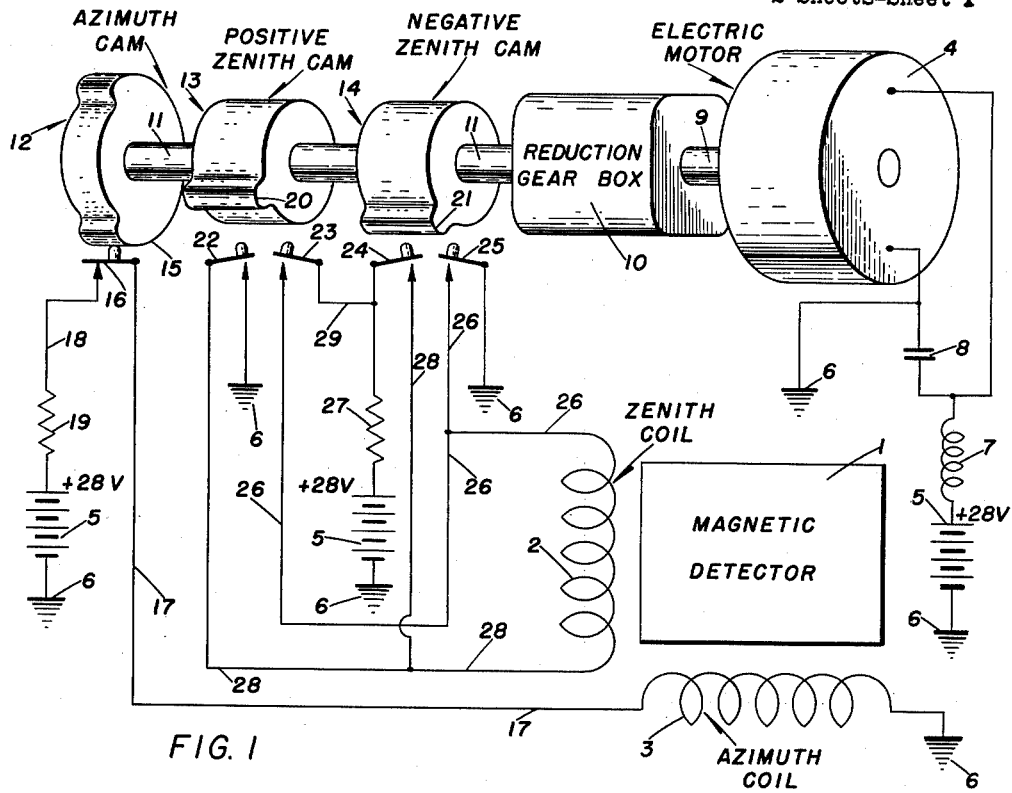
Fig. 1 is a diagram showing certain mechanism and electrical connections of an apparatus embodying the invention.

Without discussing the theory of the invention further at this time, a disclosure of its structural features and electrical connections will be given. Referring first to Fig. 1, there is shown the magnetic detector 1 which constitutes the basic element of the magnetometer. This detector contains the three mutually perpendicular cores already mentioned, and is approximately a cube in shape.

Wound around the detector 1 are two windings, or coils, 2 and 3. Winding 2 is called the zenith coil and has its axis parallel to the axis of the missile that carries the apparatus, a direction that usually is vertical in the initial portion of the missile flight. The coil 3 is known as the azimuth coil and is wound about the detector in such way that the axis of coil 3 is at right angles to that of the zenith coil 2. Preferably, the turns of these windings are distributed and spaced about the detector in such way that they will produce nearly uniform fields at said detector.

Through these coils 2 and 3 pulses of direct current are sent, at intervals determined by cam-actuated switches that will now be described. A motor 4 is energized from a source of electricity 5 carried by the missile. This may conveniently be a 28 volt battery, preferably having one terminal grounded to the missile body as shown at 6. A choke coil 7 and a capacitor 8 may be provided to prevent electrical disturbances originating in motor 4 from entering the radio circuits usually carried by the missile.

As most motors operate at undesirably high speeds, the shaft 9 of motor 4 is connected to a reduction gear box 10 whose output shaft 11 may suitably rotate at the rate of one revolution in five seconds. Three cams, 12, 13 and 14, are shown carried by this shaft 11, and thus likewise rotate once in five seconds.

Cam 12 is called the azimuth cam, and controls the current through coil 3. It will be noted that this cam has a raised "dwell" 15 extending through about three-fifths of its circumference, so that thus it will close a switch 16 actuated thereby for three seconds during each revolution of the cam 12. When switch 16 is closed, the source 5 will cause a current to flow in a circuit that contains, in series, the azimuth coil 3, wire 17, switch 16, wire 18, resistor 19, battery 5, and ground 6.

Cams 13 and 14 have their raised dwells 20 and 21 staggered with respect to each other and with respect to the dwell 15 of cam 12, in such way that the dwells 20 and 21 will be in switch-closing positions during part of the interval that switch 16 is open. Each of dwells 20 and 21 is of such peripheral extent that it will close its respective switches for approximately ½ second, with the shortest practical time interval between the actuations of the switches operated by dwells 20 and 21. Cams 13 and 14 control the energization of the zenith coil 2, as well as the direction of current flow therethrough, as follows:

The dwell 21 of cam 14 at the proper time will close switches 24 and 25, thus establishing a current flow from the positive terminal of battery 5, through resistor 27, switch 24, wire 28, zenith coil 2, wire 26, switch 25 and ground 6 to the negative terminal of the battery. This current will persist for approximately ½ second, during which the upper end of coil 2 is negative with respect to the lower end of said coil.

Almost immediately after the dwell 21 opens switches 24 and 25, the dwell 20 of cam 13 will in turn close switches 22 and 23. The effect of this is to establish a current from the positive terminal of battery 5 through resistor 27, wire 29, switch 23, wire 26, zenith coil 2, wire 28, switch 22 and ground 6 to the negative terminal of the battery. This current likewise will persist for approximately ½ second, but this time the upper end of coil 2 will be positive with respect to the lower end of said coil.

It will thus be seen that the cams 14 and 13 will produce two relatively short current pulses, following closely upon one another, but traversing the zenith coil 2 in opposite directions and thus correspondingly yielding oppositely directed magnetic fields that successively pervade the magnetic detector 1 and combine with the existing field of the earth at that location. It is desirable to have these pulses follow one another as quickly as possible, so that the earth's field will presumably not change materially during said pulses, due to any roll or spin of the missile.

The structure and circuits so far disclosed thus periodically will superimpose on the magnetic detector 1 a definite cycle of artificial magnetic fields, which will combine vectorially with the geomagnetic fields existing at any moment.

As already mentioned, the magnetic detector 1 is merely an inductance producing means, and includes no source of electricity. In order to utilize the detector it therefore becomes necessary to provide a source of electricity that is sensitive to inductance, that is, a varying or alternating source. For this purpose an oscillator 30 is provided, conveniently an audio-frequency generator that operates at an arbitrarily selected frequency of 3000 cycles per second. This alternating current, on traversing the windings of the magnetic detector 1, will provide reactive voltage drops therein proportional to the squares of their respective inductances, and as the detector windings are all connected in series, as shown in Fig. 3, the resulting total voltage drop due to said inductances will be proportional to the sum of their squares.

Figure 2:
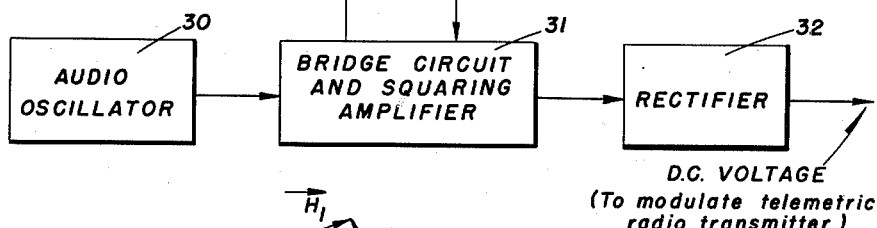
Fig. 2 is a block diagram showing certain electrical components of the apparatus and their connections.

Actually, the oscillator output is fed to the detector, not directly but through a bridge circuit forming part of the unit 31 of the block diagram, Fig. 2, and shown in detail in Fig. 3. This bridge circuit has an input transformer 33, with a center-tapped secondary winding 34, from the outer terminals of which proceed two circuits, one containing a ballast coil 35 in series with the windings of the magnetic detector 1, the other containing a similar ballast coil 36 and a compensation coil 37, equivalent in impedance to the detector windings, these two circuits being reunited at a common point through the variable resistors 38 and 39 respectively, and thence passing through variable resistor 40, tap 42 of resistor 41, and an inductance 43 to the control grid of a pentode $V_1$.

In operation, the adjustments are so made that the bridge is slightly unbalanced, so that an audio frequency carrier will be transmitted from the oscillator 30 to the control grid of the amplifier tube $V_1$ already mentioned. The tube $V_1$ is direct-current operated as indicated in the circuit diagram, and delivers its output to the primary winding 44 of a transformer 45. The secondary winding 46 of this transformer in turn supplies the input energy of a rectifier unit 32, the details of which may be conventional, and whose sole purpose is to provide unidirectional impulses that may be utilized to modulate a radio transmitter carried by the missile, for providing telemetric signals to a receiver on the terrain below, from which information concerning the orientation and/or altitude of the missile may be obtained.

Figure 4:
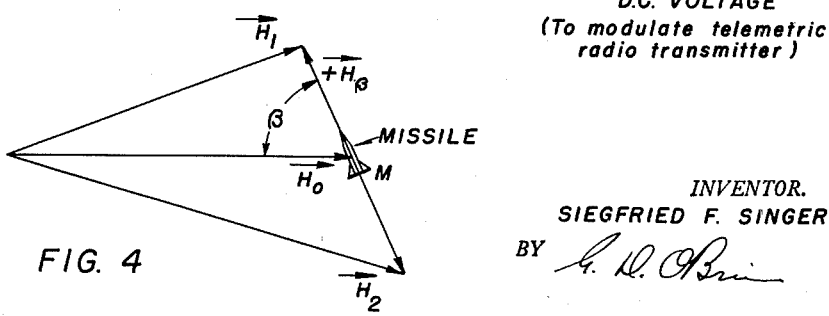
Fig. 4 is a diagram showing a missile and the magnetic fields, natural and artificial, acting thereon.

As already mentioned, the magnetic detector is responsive to the total geomagnetic field, specifically, its square. Let it now be considered what effect the longitudinal field of the zenith coil will have on this detector, when applied, first in a positive and then in a negative direction. Fig. 4 illustrates the conditions prevailing. Here $H_0$ represents vectorially the natural geomagnetic field at the location of the missile M. It will be noted that this field may have any direction whatever with respect to the missile axis, and is shown forming an angle $\beta$ with said axis, called the Z axis for convenience. The missile may spin about this axis.

The artificial field produced by the zenith coil 2, however, is always axial of the missile because said coil is fixed in the missile with its axis coincident with, or parallel to, the missile axis. The said field is here designated by $\vec{H_\beta}$, and it is positive in the positive direction of the missile axis, that is, toward the nose of the missile.

When $H_\beta$ is positive the resultant field will be $\vec{H_1}$ and when negative the resultant will be $\vec{H_2}$. The magnetic detector will actually respond only to the scalar value of the vector sum of $H_\beta$ and $H_0$, that is, it will still measure the total field, as before, in the form of an inductance representing the square of the said vector sum. In the operating range of the device, the linear relation $V = C + KH$ is assumed to exist, wherein V is the reactance drop of the detector, H is the geomagnetic total field and C and K are constants. It follows that:

$$H_1^2 = H_0^2 + H_\beta^2 - 2H_0 H_\beta \cos \beta \qquad (1)$$

and $$H_2^2 = H_0^2 + H_\beta^2 + 2H_0 H_\beta \cos \beta \qquad (2)$$

Subtracting (1) from (2)

$$H_2^2 - H_1^2 = 4H_0 H_\beta \cos \beta \qquad (3)$$

$H_1$ and $H_2$ may be replaced by $$H_1 = H_0 + \Delta H_1 \qquad (4)$$

and $$H_2 = H_0 + \Delta H_2 \qquad (5)$$

respectively.

It should be noted that in most cases $\Delta H_1$ and $\Delta H_2$ carry opposite signs. Substituting (4) and (5) in (3) leads to $$(\Delta H_2 - \Delta H_1) + \frac{(\Delta H_2)^2 - (\Delta H_1)^2}{2H_0} = 2H_\beta \cos \beta \qquad (6)$$

All the quantities on the left hand side of (6) can be determined, e.g., from the telemetric record, $H_\beta$ is known or can be determined from the dimensions of coil 2 and the value of the current; hence a solution for $\beta$ can be obtained.

The missile orientation and determination of missile spin will now be considered.

When the transverse field $H_\phi$ is applied, by energization of the azimuth coil 3 whose axis is here considered to be the X axis, extending at right angles to the missile axis Z, a similar analysis may be carried out. The field measured by the magnetic detector, and which is here designated by $H_3$, is the vector sum of $H_0$ and $H_\phi$; however, its scalar value alone is determined by said detector. It will be understood that only one artificial field is applied at any given instant, which is assured by the cam-controlled switches 16, 22, 23, 24 and 25, whose operation has already been described in connection with Fig. 1.

Referring now to Fig. 5, the vectorial relations concerning the joint effect of the geomagnetic field $H_0$ and the artificial field $H_\phi$ produced periodically by the azimuth coil 3 are illustrated. Assuming that the missile spins about the Z axis with an angular velocity of $\omega$ radians per second, this artificial field will produce a variation whose period may be expressed as $$\frac{2\pi}{\omega}$$

in the resultant obtained by thus combining it with the geomagnetic field $H_0$. The magnitude of this resultant is expressed in the equation:

$$H_3^2 = H_0^2 + H_\phi^2 + 2H_0 H_\phi \sin \beta \cos \omega t \qquad (7)$$

It should be noted that the amplitude of the variation as expressed by the last term of (7) is a function of $\beta$, which becomes zero when $\beta$ is zero. This means that said variation vanishes when the missile axis is parallel to the direction of the earth's field, and hence this method of determining missile roll cannot be used in that case.

The method of determining orientation with respect to the magnetic field can also be useful for guidance. As an example, one such application will be indicated here. It might be desired to have the missile axis and trajectory coincide with a magnetic line of force, i.e., $\beta=0$. The missile flight might be controlled by a stable element whose drift is corrected for by means of the magnetic orienter constituting the present invention. Equation 6 is applicable in this situation; however, it is undesirable to use the zenith coil test field $\vec{H}_\beta$ because the method is not very sensitive to small changes of $\beta$ when $\vec{H}_\beta$ and $H_0$ are parallel or nearly so.

$$|H_2|-|H_1|=2H_\beta\left(1-\frac{\beta^2}{2!}+\frac{\beta^4}{4!}-\frac{\beta^6}{6!}+\ldots\right) \quad (8)$$

The right side of Equation 8 indicates a rather flat maximum. Much better approach to accuracy can be obtained by using the azimuth coil test field $H_\phi$, first positive, then negative, and perhaps positive again or possibly by using a low-frequency alternating field, for instance, between 1 and 100 cycles/sec., to eliminate any changes introduced by missile roll. In this case $$|H_2|-|H_1|=2H_\phi\left(\beta-\frac{\beta^3}{3!}+\frac{\beta^5}{5!}-\frac{\beta^7}{7!}+\ldots\right) \quad (9)$$

No change will be observed in the output of the magnetic detector when the missile Z-axis is made parallel to the magnetic field. The sensitivity is seen to be a maximum, the change $H_2-H_1$ proportional to $H_\phi$ and to the error angle $\beta$. It should be noted that (9) is sensitive to the sign of $\beta$.

In Equations 8 and 9, as well as Equation 12, the vertical bars enclosing a quantity are used in the conventional manner to designate the absolute or scalar magnitude of the quantity so enclosed. Further, it may be remarked that whereas Equation 9 is sensitive to the sign of $\beta$, because it contains the odd powers, on the contrary Equation 8 is not sensitive thereto because it contains only the even powers of $\beta$.

It is possible to check the detector sensitivity while the missile is in flight, as follows:

By adding Equations 1 and 2 there is obtained $$H_1^2+H_2^2=2(H_0^2+H_\beta^2) \quad (10)$$

Substituting Relations 4 and 5 gives $$H_\beta^2=H_0(\Delta H_1+\Delta H_2)+\tfrac{1}{2}(\Delta H_1^2+\Delta H_2^2) \quad (11)$$

The quantities on the right hand side of (11) are determined from the magnetometer readings; $H_\beta^2$ can be then computed from (11) and compared with the $H_\beta^2$ known from preflight calibrations. In this way, the sensitivity $$K=\left(\frac{\Delta V}{\Delta H}\right)$$

of the magnetometer can be checked for constancy throughout flight.

Certain special cases will now be discussed:

From examination of Fig. 1 it is possible to deduce the following results from Equation 11:

(i) Determination of K, independent of C:

With $$\beta=0, \quad \Delta H_1=-\Delta H_2$$

then (11) reduces to an expression independent of H.

$$|H_\beta|=|\Delta H_1|=|\Delta H_2| \quad (12)$$

allowing determination of the sensitivity of the magnetometer from $$K=\frac{H_\beta}{\Delta V_1}=\frac{H_\beta}{\Delta V_2}$$

(ii) Determination of C, after K is known: With $\beta=0$, application of the transverse test field, positive and negative, yields $$H_\phi^2=2H_0\Delta H_3+\Delta H_3^2 \quad (13)$$

or $$H_0=\frac{1}{2\Delta H_3}\cdot(H_\phi^2-\Delta H_3^2) \quad (14)$$

On the right hand side of Equation 14, $H_\phi$ is known, $H_0=C+KV_0$ and $\Delta H_3=K\Delta V_3$ are determined from the telemetric record. $H_0$ can also be solved for and compared with the experimental value. Any discrepancy not due to a change in sensitivity (Equation 12) can be attributed to detector drift.

The procedures may also be applied to using the apparatus as a magnetic altimeter:

After making due allowances for magnetic anomalies and variations (permanent and transient), the value of $H_0$ at a point, known to be at a certain latitude and longitude, determines roughly its altitude. Knowing the geographic position of a missile, the total field magnetic detector can also be used as a magnetic altimeter. Inaccuracies arising out of changes in sensitivity and D.C. drift of the detector can be corrected for by applying the results of the analysis of the preceding paragraph.

From the above discussion it will be seen that the present invention provides a relatively simple apparatus and procedure for use in orientation and guidance of missiles, based on the total field magnetic detector. The output of this device is independent of the orientation of the detector with respect to the earth's field, thus materially simplifying the mechanism by eliminating the need for any apparatus to hold the detector in a fixed direction. This in turn leads to compactness and low weight. The electrical parts require relatively slight power, which is also an advantage in missile-carried apparatus, as it permits a decrease in the size and weight of the power source that must be housed and carried by the missile.

It will be understood that the output of the rectifier unit 32 is a varying but unidirectional voltage that is used to modulate the radio transmitter carried by the missile, to provide signals suitable for telemetry, which are received by radio receiving apparatus set up on the terrain beneath the missile.

Obviously many modifications and variations of the present invention are possible in the light of the above teachings. It is therefore to be understood that within the scope of the appended claims the invention may be practiced otherwise than as specifically described.

What is claimed is:

1. A magnetic orienter to be carried by an airborne vehicle, comprising a total field magnetic detector, a source of electricity, a winding fixed with respect to the vehicle, and in proximity to said detector and means establishing an electrical circuit through said source and said winding, whereby the winding produces an electromagnetic field superimposed upon the earth's magnetic field normally acting on the detector.

2. A magnetic orienter as defined in claim 1, wherein means are provided for periodically closing and opening said circuit.

3. A magnetic orienter as defined in claim 1, wherein means periodically reversing the current through said winding are provided, whereby the field produced by the winding correspondingly changes its direction.

4. A magnetic orienter to be carried by an airborne vehicle, comprising a total field magnetic detector, and two windings in proximity to said detector, one winding having its axis parallel to the longitudinal axis of the vehicle, the second winding having its axis transverse to that of the other winding, a source of electricity, means establishing separate circuits through said windings and said source and means for periodically and alternatively closing said circuits, thus correspondingly superimposing artificial magnetic fields, in different directions, on the earth's magnetic field at the location of the detector.

5. A magnetic orienter to be carried by an airborne vehicle, comprising a total field magnetic detector, a winding having its axis parallel to the longitudinal axis of the vehicle, a source of electricity, means comprising switches and circuits for periodically successively energizing said winding in opposite directions from said source, a second winding having its axis transverse to the longitudinal axis of the vehicle, and means comprising switches and circuits for periodically energizing said second winding from said source at times alternative with the energization of said first winding, whereby the detector is periodically subjected to successive longitudinal electromagnetic fields in opposite directions, and to an electromagnetic field transverse to said first named fields.

6. Apparatus for determining the roll of a missile, comprising a total field magnetic detector, a winding having its axis transverse to the missile axis about which the roll occurs, a source of electricity, and means periodically providing a closed circuit through said winding and said source to energize the winding and thereby add an artificial magnetic field to the earth's field normally traversing the detector.

7. Apparatus to be carried by an airborne vehicle for determining the orientation of said vehicle, comprising, means for producing an artificial magnetic field of known value directed along the longitudinal axis of said vehicle, said field thus being superimposed upon the geomagnetic field at the vehicle, means for periodically reversing said artificial magnetic field, and a total field magnetometer for measuring the resultant combined magnetic fields.

8. Apparatus to be carried by an airborne vehicle for determining the orientation of said vehicle, comprising, a winding having its axis directed in the direction of the longitudinal axis of said vehicle, a source of electrical energy for energizing said winding to produce an artificial magnetic field of known value in said direction, a motor, a pair of cams actuated by said motor, a pair of switches operated by the respective cams, said switches connecting said winding successively in opposite directions to said source of electricity, thus periodically reversing the artificial magnetic field, said artificial field being superimposed on the geomagnetic field existing at the vehicle, and a total field magnetometer for measuring the resultant total magnetic fields.

References Cited in the file of this patent

UNITED STATES PATENTS

| | | |
|---|---|---|
| 2,283,919 | Diamond et al. | May 26, 1942 |
| 2,287,786 | Diamond et al. | June 30, 1942 |
| 2,406,870 | Vacquier | Sept. 3, 1946 |
| 2,468,554 | Hull | Apr. 26, 1949 |
| 2,485,931 | Slonczewski | Oct. 25, 1949 |